Oct. 25, 1966          H. S. HEMSTREET            3,281,529
                VISUAL DISPLAY METHOD AND APPARATUS
Original Filed Jan. 5, 1955                    2 Sheets-Sheet 1
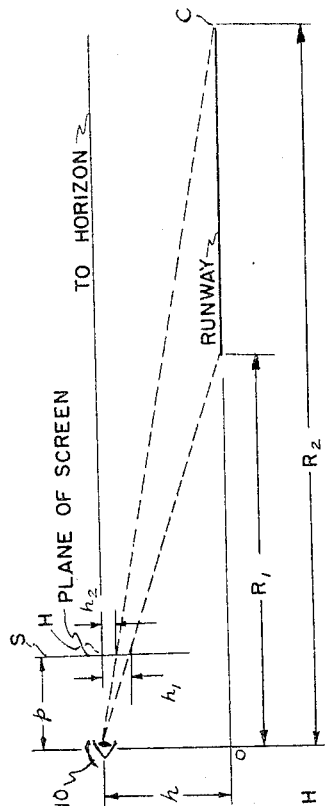
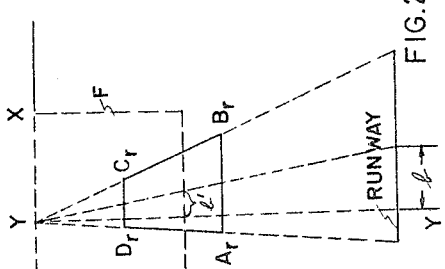
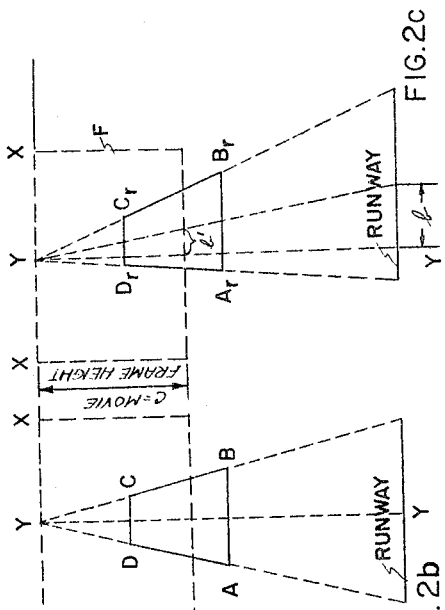
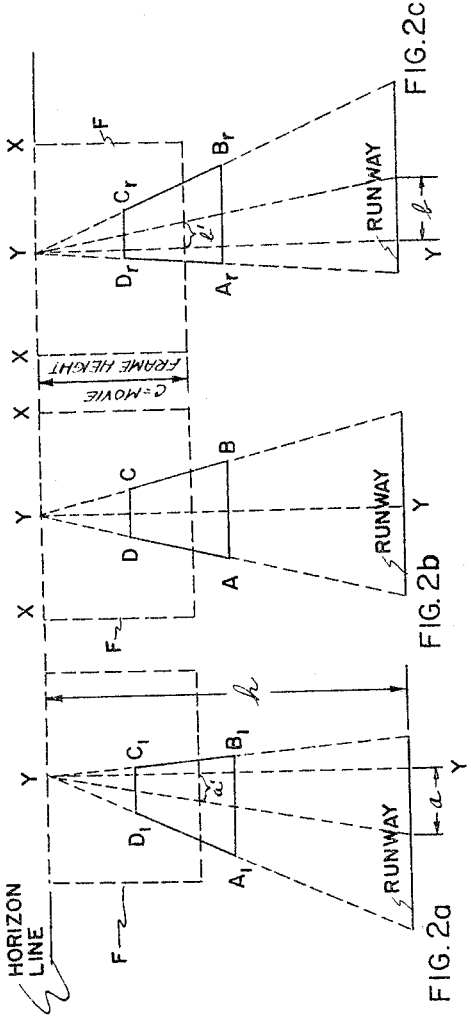
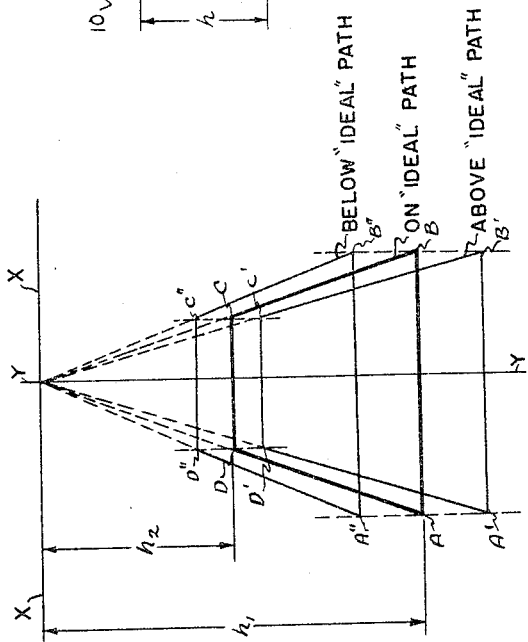
HAROLD S. HEMSTREET
INVENTOR
BY Richard G. Stephens
ATTORNEY

HAROLD S. HEMSTREET
INVENTOR

United States Patent Office 3,281,529
Patented Oct. 25, 1966

3,281,529
VISUAL DISPLAY METHOD AND APPARATUS
Harold S. Hemstreet, Wilton, Conn., assignor to General Precision, Inc., a corporation of Delaware
Original application Jan. 5, 1955, Ser. No. 480,033. Divided and this application Jan. 30, 1961, Ser. No. 85,543
1 Claim. (Cl. 178—6)

My invention, which has been divided from my co-pending application, Serial No. 480,033, filed January 5, 1955, now Patent No. 2,999,322, relates to method and apparatus for presenting a visual display. A need has existed for improved methods and apparatus for simulating the scenes viewed during a course of travel which changes greatly in altitude and distance, such as those scenes viewed during landings and takeoffs made in a fixed wing aircraft. The novel method briefly described comprises providing an object having an appearance of an area viewed from a reference viewpoint, such as by taking a motion picture of an actual flight maneuver, projecting an image of the object such as the motion picture onto a viewing surface for observation as by a student in a conventional flight trainer, and automatically "distorting" the image or projected picture in accordance with deviations from the reference viewpoint.

It is therefore a primary object of the invention to provide a novel projection method and apparatus by means of which a picture taken at a particular point may be distorted so as to simulate the scene as viewed from a different point.

It is an additional object of the invention to provide improved method and apparatus for presenting an improved visual display for use in conjunction with grounded training apparatus.

It is a further object of the invention to provide means for converting a picture illustrated in a first coordinate system into a picture illustrated in a second coordinate system.

A more specific object of the invention is to provide means by which a picture is scanned by a television camera tube in one coordinate system and reproduced by a television camera tube scanned according to a second and different coordinate system.

Yet another object of the invention is to provide means for converting a picture scanned by a camera tube in one form to a different form upon display on a picture tube.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIGS. 1a and 1b are diagrams representing, respectively, perspective front views and a side view of a typical aircraft approach path, the diagrams being useful in comprehending the nature of vertical distortion provided by my invention to simulate deviations in altitude.

FIGS. 2a, 2b and 2c are diagrams illustrating the appearance of a rectangular grounded surface from three different view points, useful in understanding the operation of the invention.

Figure 3A:
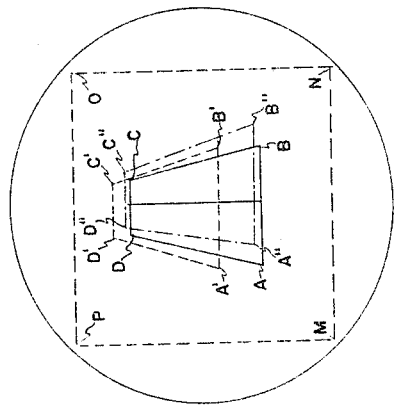
FIGS. 3a and 3b are respectively, a diagram representing the face of a cathode ray tube utilized in an embodiment of the invention, and a schematic diagram of the embodiment of the invention in which distortion is accomplished electrically. In all of the figures, well-known parts are shown in block diagram form for sake of clarity.

Referring to FIG. 1a there is shown in heavy lines a trapezoidal or keystone shaped area ABCD which is the appearance in perspective of a rectangular grounded surface such as an airport runway might have at a particular point along a reference or ideal approach or glide path preparatory to landing an aircraft. Being symmetrical about the centerline Y—Y, the shape is such as that seen as a pilot approaches the runway on a line which is an extension of the centerline of the runway. Also shown in FIG. 1a are a shape A'B'C'D' representing the shape the same rectangular grounded surface might have if viewed from a point *above* the aforementioned particular point, and a shape A"B"C"D" representing the same rectangular grounded surface as viewed from a point *below* the aforementioned particular point. In FIG. 1a, the line X—X represents the horizon and is perpendicular to the line Y—Y. With the line Y—Y forms a pair of rectangular Cartesian coordinate axes. In this cordinate system the equation for the line AB is $$y = -h_1 \quad (1)$$

and the equation for the line DC is $$y = -h_2 \quad (2)$$

The expression for the segment AD is given by $$y = kx \text{ for } h_1 \leq y \leq h_2 \quad (3)$$

where $k$ is a constant; the segment CB is given by $$y = -kx \text{ for } h_1 \leq y \leq h_2 \quad (4)$$

Referring now to FIG. 1b there is shoown a side elevation view of the ideal approach path and runway, with the eye 10 of the pilot situated a distance $h$ above ground or runway level, distance $h$ being the instantaneous flight altitude. It will be seen that if a screen S is placed a distance $p$ in front of the viewpoint that the scene presented to the pilot may be simulated by projection of a suitable scene onto screen S. Assuming that screen S is mounted in a generally vertical position, it may be seen that for realistic presentation that the distances of objects below the horizon line on the screen must be inversely proportional to the horizontal distance between those points and the ground position of the viewpoint. For example, the distance $h_1$ on the screen between the horizon and the near end of the runway is inversely proportional to $R_1$, the horizontal distance between the aircraft viewpoint 10 and the actual near end of the runway, or as may be seen by similar triangles:

$$h_1 = h \frac{p}{R_1} \quad (5)$$

Similarly, the distance $h_2$ on the screen between the horizon and the far end of the runway C is inversely proportional to $R_2$, the horizontal distance between the viewpoint 10 and the actual far end of the runway C, or that:

$$h_2 = h \frac{p}{R_2} \quad (6)$$

It may now be appreciated that for a particular point along an approach or glide path, that increases in altitude require proportionate increases in distance $h_1$ and $h_2$ of such a simulated runway projected upon a screen, and that conversely, decreases in altitude require proportionate decreases in distance $h_1$ and $h_2$ of a simulated runway picture. Thus variations in altitude above and below an ideal approach path require that projected pictures of a ground scene taken during such an ideal path must be uniformly "stretched" or "squeezed" in the vertical direction with respect to the horizon line. This may also be made apparent by reference to FIG. 1a. To generate figures A'B'C'D' and A"B"C"D" it is only necessary to make primitive affine linear transformations of the original X-Y coordinate system.

$$y'=(1-u)y \quad (7)$$
$$x'=x \quad (8)$$

and $$y''=(1+u)y \quad (9)$$

where $u$ is considered as a small constant, proportional to the amount above or below the ideal that the figures are to represent.

Referring to FIG. 2 there are shown the appearances of a rectangular grounded surface such as an airport runway under each of three different circumstances. FIG. 2b illustrates the scene which might be viewed as an aircraft approaches the runway directly in line with the runway center line. The runway is designated as in FIG. 1a as the trapezoid ABCD in the same XY coordinate system. FIG. 2a illustrates the scene as viewed when an aircraft is displaced a distance "$a$" to the right of the runway center line; the runway is then shown as the asymmetrical trapezoid $A_rB_rC_rD_r$. FIG. 2c represents the scene during a similar lateral displacement "$b$" to the left of the runway center line. Superimposed upon each portion of FIG. 2 in dashed lines is a rectangle F representing one frame of a motion picture which might be used to project the scene viewed as a pilot files an approach path. It may be seen from similar triangles that the displacements $a'$ and $b'$ of the centerline on the film at the lower edge of the film frame from the center of the film frame are proportional to the ratio of the lateral displacement of the aircraft to the altitude of the aircraft. If the pictures are taken so that the horizon is located along the upper edge of the frame, then the lateral displacement of the picture at any point from a given lateral displacement in the approach path is proportional to the distance from that point to the top of the frame. If the actual camera utilized causes an inversion of the picture, it will be apparent that the "top" and "bottom" of the film frame are correspondingly inverted in the above analysis. Thus it may be seen that by providing distortion of a film projection varying in accordance with the magnitude of deviation from a centered glide path, and varying linearly from zero distortion at a horizon point to maximum distortion at a point representing a nearest location, that a scene varying in accordance with lateral displacement from a reference ideal or centered approach may be projected.

As in the case of FIG. 1 it will be apparent that the trapezoids of FIGS. 2a and 2c may be generated from the figure ABCD by primitive affine linear transformations, here in the nature of shear.

$$y_r=y \quad (10)$$
$$x_r=x-bvy \quad (11)$$
$$y_l=y \quad (12)$$

and $$x_l=x+bvy \quad (13)$$

where $v$ is a constant of proportionality.

Since the transformations illustrated by FIG. 1a and by FIGS. 2a, 2b, 2c are both linear transformations, their linear combination is a linear transformation as is their further combination with the linear transformations of pure translation and rotation.

In the parent case, application Serial Number 480,033 now Patent Number 2,999,322 of which this is a division, means are disclosed for effecting the necessary distortion of film images by anamorphic lens system.

Figure 3B:
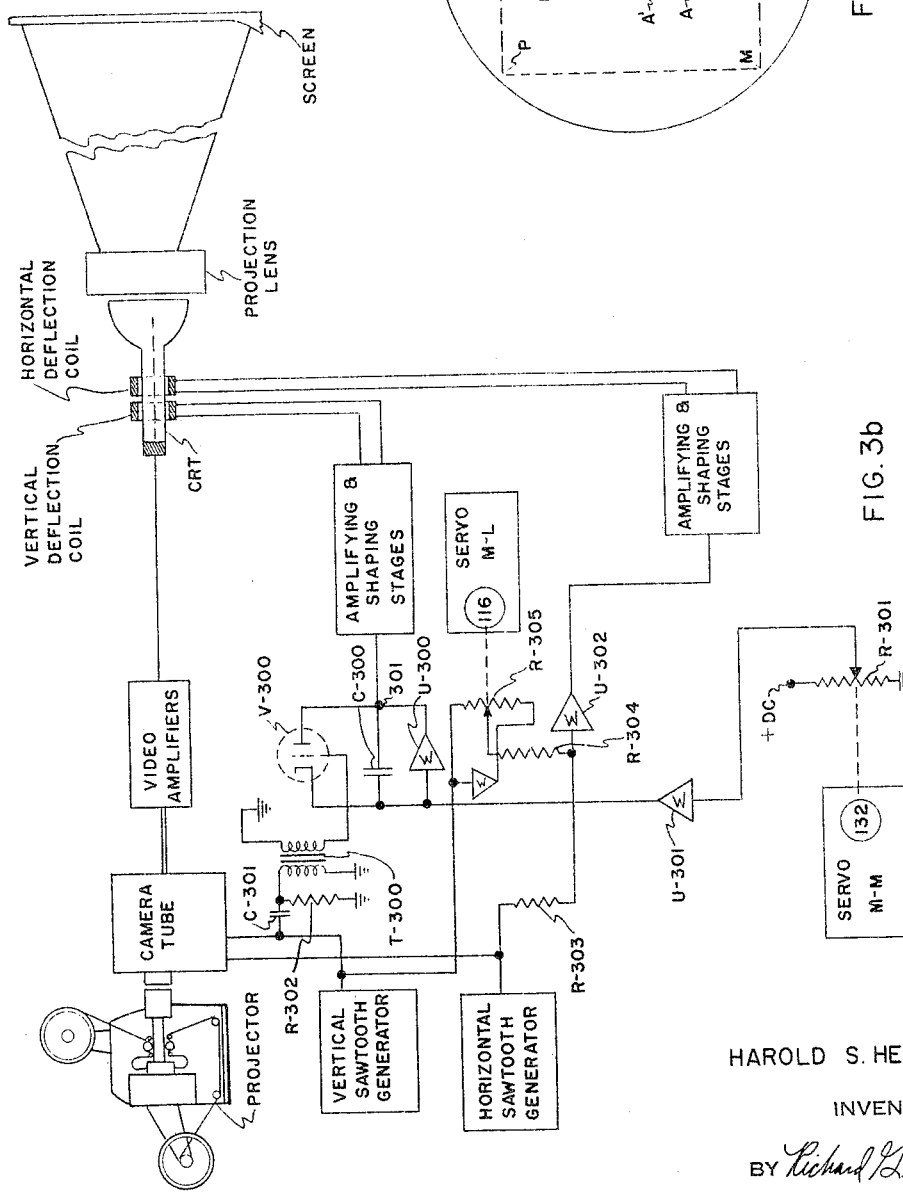

Shown in FIGURES 3a and 3b are a diagrammatic view of the face of a cathode ray tube and a schematic diagram illustrating an embodiment of the anamorphic apparatus of the present invention in which distortion of the film image is accomplished electrically rather than optically. Referring to FIG. 3b the conventional motion picture projector projects an image of a reference or "ideal" flight path to a light-sensitive pick-up apparatus comprising a conventional television camera tube having a conventional scanning system operated by vertical and horizontal sawtooth oscillators or generators, producing a video signal varying with the light values of the successively scanned elementary areas of the picture. This signal is amplified in conventional video amplifiers and applied between the grid and cathode to control the intensity of the light producing beam of a conventional projection cathode ray tube CRT. The cathode ray tube is equipped in conventional manner with accelerating anodes and a high voltage power supply (not shown), and hence an image is provided on the face of the cathode ray tube CRT. This image is focused on the screen for observation by the student by a conventional projection lens system. The apparatus in FIG. 3b (with the exception of the screen) may be mounted for yawing, pitching and banking in the same manner as the optical projection system disclosed in the above-mentioned parent case, thereby introducing linear transformations of two degrees of translation and rotation.

The camera tube and the picture tube are both scanned in $x$ and $y$. Neglecting interlace, the vertical scan of the camera tube is a periodic function of time, $t$, which may be represented on any sweep by the expression for the ramp function:

$$y=Kt \quad -0.0083 \leq t \leq 0.0083 \text{ seconds} \quad (14)$$

The horizontal or x-scan as a function of time is typically given by:

$$x=X_0+\sum_{n=1}^{N} a_n \sin nwt \quad (15)$$

representative of the Fourier series of N significant terms of the saw-tooth wave of frequency $w/2\pi$.

If, for the picture tube, the vertical deflection, the horizontal deflection, or both follows a different law or function, distortion will appear in the displayed image.

In particular, if the picture tube $x$ and $y$ deflections are a linear combination of the corresponding camera tube deflections, then the picture tube image is a linear transformation of the image scanned by the camera tube.

Thus if the picture tube vertical deflection, designated $y'$ is at a different rate from the camera tube, and the horizontal sweeps match, i.e.

$$y'=K't \quad -0.0083 \leq t \leq 0.0083, K \neq K' \quad (16)$$

then for any time, $$y'=K'y/K \quad (17)$$

and $$x'=x \quad (18)$$

It will be seen that this is the transformation in the same form as that of Equations 7 through 9 required to correct for viewpoint above or below the ideal as demonstrated by FIGS. 1a and 1b.

By adding a fraction of the vertical deflection signal to the horizontal deflection of the camera tube so that $$y'=y \quad (19)$$

and $$x'=k'y+X_0+\sum_{n=1}^{N} a_n \sin nwt \quad (19)$$

or $$=k'y+x \quad (20)$$

the result is in the form of Equations 10 through 13 in the transformation to compensate for lateral deviations from the reference path. The sheared image makes a realistic simulation of lateral displacement as illustrated in FIGS. 2a, 2b and 2c.

Sweep voltage for the vertical deflection system of the cathode ray tube CRT is derived by integrating a constant voltage during a sweep cycle by means of a conventional direct current integrator, which comprises a conventional feedback amplifier U–300 provided with a capacitor C–300 in its feedback circuit. A direct voltage applied via potentiometer R–301 and summing amplifier U–301 is integrated with respect to time, providing a linearly increasing voltage at the output terminal 301 of the integrator. A circuit comprising capacitor C–301, transformer T–300 and triode V–300 is provided to discharge capacitor C–300 periodically, after which the integrating circuit will begin to integrate again, providing a sawtooth output potential at terminal 301. The integrating capacitor C–300 is discharged at the camera tube vertical sweep repetition rate by causing triode V–300 to conduct at the end of each camera tube sweep cycle. The rapid change in camera tube vertical sweep voltage during vertical retrace time is differentiated by capacitor C–301 and resistor R–302 and applied to pulse the primary of transformer T–300. The positive-going terminal of the secondary winding of transformer T–300 is connected to drive the grid of triode V–300 highly positive during retrace, causing triode V–300 to conduct so as to discharge integrating capacitor C–300, producing a vertical retrace on the projection cathode ray tube. The vertical sweep potential at terminal 301 is amplified and shaped in conventional vertical sweep amplifying means indicated in block diagram form and thereafter applied to the vertical deflection system of projection cathode ray tube CRT. While the projection cathode ray tube is shown as utilizing magnetic deflection, those skilled in the art will readily recognize that electrostatic deflection may be substituted without departing from the invention.

The rate at which the vertical sweep voltage at terminal 301 will increase is directly proportional to the amplitude of the potential applied to the integrator from potentiometer R–301. Assume that with the arm of potentiometer R–301 set in the position shown that the vertical sweep applied to CRT is such as to provide a trapezoid pattern ABCD shown in solid lines in FIG. 3a on the face of CRT. As the arm of potentiometer R–301 is driven downwardly a lesser input potential will be applied to the integrator, causing the slope of the vertical sweep voltage to decrease. It will be evident to those skilled in the art that such an increase in vertical sweep rate will cause the pattern on the face of CRT to be moved upwardly and compressed with respect to the upper edge of the raster MNOP to provide a trapezoid such as A'B'C'D'. The amount of displacement of each portion of the image will be proportional to its distance from the top of the raster, and hence it will be seen that if the upper edge of the raster is made to represent the horizon edge of each film frame projected, that the image on the face of the cathode ray tube will be uniformly squeezed or stretched with respect to the horizon by variation of the voltage applied from potentiometer R–301. Thus the vertical deflection system provided serves to produce distortion, as illustrated in FIGS. 1a and 1b. The arm of potentiometer R–301 may be positioned by servomotor 132 to a position commensurate with the ratio between simulated aircraft altitude and ideal or reference path altitude.

The horizontal sweep potential utilized to scan the camera tube is also applied via resistor R–303 and summing amplifier U–302 and conventional horizontal sweep amplifying, shaping and impedance matching means to drive the horizontal sweep system of cathode ray tube CRT. Assuming that the simulated aircraft is not laterally displaced from the ideal or reference path, no potential will be applied to amplifier U–302 via resistor R–304, and the cathode ray tube horizontal sweep will be centered on the face of tube CRT. If a constant voltage were applied via resistor R–304, it would be apparent that the picture on the face of CRT might be moved uniformly to the right or left, the top and bottom of the picture moving equal amounts. However, if a voltage increasing linearly with vertical sweep is applied via resistor R–304 all positions of the picture will be laterally displaced in amounts which vary in accordance with the distance of such portions from the top of the picture. For example, trapezoid ABCD might be altered to form trapezoid A''B''C''D'', the latter being shown also slightly displaced vertically for sake of clarity. If the beginning of the vertical sweep (upper edge of the raster) represents the horizon, it will be seen that the picture on the face of CRT will be properly distorted to cause realistic simulation of lateral displacement from the ideal or reference path. Such a voltage is applied via resistor R–304 from potentiometer R–305. The winding of potentiometer R–305 is excited at opposite ends by vertical sweep voltages of opposite sense. When the arm of potentiometer R–305 is centered on the winding no voltage will appear on the arm, but as the arm is driven upwardly or downwardly a positive or negative sawtooth having a repetition rate corresponding to vertical sweep and an amplitude and polarity dependent upon the position of potentiometer R–305 will be applied to cause sloping of the picture. The arm of potentiometer R–305 may be positioned by servomotor 116 in accordance with the ratio between lateral displacement of the simulated aircraft from the reference path and altitude of the referenced path. Thus it will be seen that the vertical and horizontal sweep distorting means provided serve to distort the reference path image received by the camera tube to provide an image representing a scene as viewed from the path of simulated flight.

In the image distorting means shown in FIG. 3b the film image is scanned uniformly and linearly, and distortion is introduced by varying the horizontal and vertical sweeping of the projection picture tube CRT. It is quite within the scope of my invention to sweep the picture tube CRT with uniform sweep potentials and to introduce the required distortion by non-uniform scanning of the film with the camera tube. This may be accomplished by interchanging the camera tube sweep potential connections with the projection picture tube sweep potential connections. With such changed connections the video signals applied to the picture projection tube CRT from the camera tube will be "Distorted," so that a particular portion of a vertical sweep cycle represents a particular "distorted" altitude rather than the ideal or reference altitude.

While I have shown a projection system utilizing a conventional motion picture film, it will be apparent that transparent object others than motion picture films may be utilized to provide images having the appearance of areas as viewed from reference viewpoints, and further, that images need not be provided by projection through transparencies, but may be provided by reflection from model scenes, for example, which have the appearance of areas as viewed from the reference viewpoints.

As mentioned above it may be desirable when practicing the invention to take motion pictures of a reference path with the anamorphic appartus set in a mean position and to provide the proper distortion by deviating the anamorphic apparatus from the mean position in accordance with deviations of simulated flight from the reference flight path. Similarly, the lateral or shear distortion means may be set in a mean or aribtrary position while the pictures are taken, and then deviated from its mean position in accordance with lateral deviations of the simulated flight path. It may be noted that in such cases the film will contain pictures which are distorted representations of an area viewed from the reference path. In providing other transparencies or in providing objects suitable for reflection of images, such transparencies or objects may be provided with distortion in amounts which may be exactly compensated for by the distortion provided by the vertical and lateral distortion means while such are positioned to arbitrary "mean positions."

It will thus be seen that the objects set forth above, among those made apparent from the preceding description, are efficiently attained. Since certain changes may be made in carrying out the above method and in the constructions set forth without departing from the scope of the invention, it is intended that all matter contained in he above description or shown in the accompanying drawing shall be interpreted as illustrative and not in a limiting sense.

In keeping with the specification, the words "distortion" and "distorting" are intended to refer to controlled modification of an image, with greater magnification being applied to certain portions of the image than to other portions, or with different magnification being applied along one axis of an image than another axis, so that an alteration in apparent perspective is obtained. The words "magnify" and "magnification," of course, are intended to refer to fractional power magnification as well as to magnification greater than unity power.

Having described my invention, what I claim as new and desire to secure by Letters Patent is:

A system for converting a picture from one form into a different form comprising light-sensitive picture pick-up apparatus for scanning the picture field with a scanning movement in two coordinate directions and producing a signal varying with the light values of the successive elementary areas of said picture, picture-reproducing apparatus having scanning means operating in synchronism with the pick-up scanning and moving a light-producing beam over a viewing screen in two coordinate directions at least one of which varies according to a different law from that of the corresponding coordinate scanning movement of said pick-up appartus, and means controlling the intensity of said beam by the signal from said pick-up apparatus.

No references cited.

DAVID G. REDINBAUGH, *Primary Examiner.*
NEWTON N. LOVEWELL, *Examiner.*
S. W. CAPELLI, R. M. HESSIN, J. McHUGH,
*Assistant Examiners.*